(12) United States Patent
Kang et al.

(10) Patent No.: US 9,803,048 B2
(45) Date of Patent: *Oct. 31, 2017

(54) ORGANIC ZINC CATALYST AND PREPARATION METHOD THEREOF

(71) Applicant: LG CHEM, LTD., Seoul (KR)

(72) Inventors: Seong Kyun Kang, Daejeon (KR); Hyun Ju Cho, Daejeon (KR); Sung-Kyoung Kim, Daejeon (KR); Jong Won Lee, Daejeon (KR); Seung Young Park, Daejeon (KR); Hyeon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/917,898

(22) PCT Filed: Oct. 30, 2014

(86) PCT No.: PCT/KR2014/010304
§ 371 (c)(1),
(2) Date: Mar. 9, 2016

(87) PCT Pub. No.: WO2015/065067
PCT Pub. Date: May 7, 2015

(65) Prior Publication Data
US 2016/0222159 A1    Aug. 4, 2016

(30) Foreign Application Priority Data

Nov. 4, 2013  (KR) .................... 10-2013-0132818
Oct. 29, 2014  (KR) .................... 10-2014-0148608
Oct. 29, 2014  (KR) .................... 10-2014-0148609

(51) Int. Cl.
C08G 64/34      (2006.01)
B01J 31/12      (2006.01)
(Continued)

(52) U.S. Cl.
CPC ............. C08G 64/34 (2013.01); B01J 31/12 (2013.01); C08G 64/0208 (2013.01)

(58) Field of Classification Search
CPC .................................................. C08G 64/34
(Continued)

(56) References Cited

U.S. PATENT DOCUMENTS 4,783,445 A    11/1988  Sun
4,943,677 A     7/1990  Rokicki
(Continued)

FOREIGN PATENT DOCUMENTS

CN    1082064 A     2/1994
CN    1322220 A    11/2001
(Continued)

OTHER PUBLICATIONS

Jong-Seong Kim et al., "Hydrothermal Synthesis of Single-Crystalline Zinc Glutarate and Its Structural Determination", Chem. Mater., vol. 16, No. 16, 2004, pp. 2981-2983.
(Continued)

*Primary Examiner* — Duc Truong
(74) *Attorney, Agent, or Firm* — Dentons US LLP

(57) ABSTRACT

An organic zinc catalyst and a preparation method thereof are provided. According to the present invention, the organic zinc catalyst has a smaller thickness and a larger surface area to exhibit more improved activity in polymerization for the preparation of a poly(alkylene carbonate) resin.

8 Claims, 1 Drawing Sheet

(51) Int. Cl.
*C08G 64/02* (2006.01)
*C07C 51/41* (2006.01)

(58) Field of Classification Search
USPC ........................................................ 528/405
See application file for complete search history.

(56) References Cited

U.S. PATENT DOCUMENTS

| | | | |
|---|---|---|---|
| 4,960,862 | A | 10/1990 | Carroll et al. |
| 4,981,948 | A | 1/1991 | Kawachi et al. |
| 5,026,676 | A | 6/1991 | Motika et al. |
| 5,811,365 | A | 9/1998 | Barry |
| 5,945,458 | A | 8/1999 | Barry |
| 6,617,467 | B1 | 9/2003 | Müller et al. |
| 7,405,265 | B2 | 7/2008 | Moon et al. |
| 8,507,708 | B2 | 8/2013 | Dehghani et al. |
| 2003/0134740 | A1 | 7/2003 | Meng et al. |
| 2004/0214718 | A1 | 10/2004 | Meng et al. |
| 2005/0272904 | A1 | 12/2005 | Moon et al. |
| 2009/0240025 | A1 | 9/2009 | Fujimoto et al. |
| 2011/0152377 | A1 | 6/2011 | Hanma et al. |

FOREIGN PATENT DOCUMENTS

| | | | |
|---|---|---|---|
| CN | 1692135 | A | 11/2005 |
| CN | 102166516 | A | 8/2011 |
| CN | 102439062 | A | 5/2012 |
| CN | 102872919 | A | 1/2013 |
| EP | 2433976 | A1 | 3/2012 |
| JP | 02-292328 | A | 12/1990 |
| JP | 08-504163 | A | 5/1996 |
| JP | EP 0358326 | * | 12/1996 |
| JP | 2732475 | B2 | 3/1998 |
| JP | 3000064 | B2 | 1/2000 |
| JP | 2005-530021 | A | 10/2005 |
| JP | 2005-530022 | A | 10/2005 |
| JP | 2006-002063 | A | 1/2006 |
| JP | 2006-503946 | A | 2/2006 |
| JP | 2007-126547 | A | 5/2007 |
| JP | 2010-287563 | A | 12/2010 |
| JP | 2012-180445 | A | 9/2012 |
| JP | 2012-232287 | A | 11/2012 |
| JP | 2013-212973 | A | 10/2013 |
| KR | 10-1993-0003163 | B1 | 4/1993 |
| KR | 10-1998-0020821 | A | 6/1998 |
| KR | 10-1998-0034110 | A | 8/1998 |
| KR | 10-2003-0097236 | A | 12/2003 |
| KR | 10-2003-0097237 | A | 12/2003 |
| KR | 10-0722380 | B1 | 5/2007 |
| KR | 10-2009-0025219 | A | 3/2009 |
| KR | 10-2012-0023820 | A | 3/2012 |
| KR | 10-2013-0044223 | A | 5/2013 |
| WO | 00/14141 | A1 | 3/2000 |
| WO | 2004/000912 | A1 | 12/2003 |
| WO | 2010/016219 | A1 | 2/2010 |
| WO | 2010/069000 | A1 | 6/2010 |
| WO | 2011/004730 | A1 | 1/2011 |
| WO | 2011/107577 | A2 | 9/2011 |

OTHER PUBLICATIONS

Kim, et al.: "Synthesis of Zinc Glutarates with Various Morphologies Using an Amphiphilic Template and Their Catalytic Activities in the Copolymerization of Carbon Dioxide and Propylene Oxide", Wiley InterScience, Journal of Polymer Science: Part A; Polymer Chemistry, vol. 43, Dec. 2005, pp. 4079-4088.
"Propionic Acid", ICSC:0806, http://www.nihs.go.jp/ICSC/icssj-c/icss0806c.html, English: http://www.inchem.org/documents/icsc/icsc/eics0806.htm, 1997.

* cited by examiner

[FIG. 1]
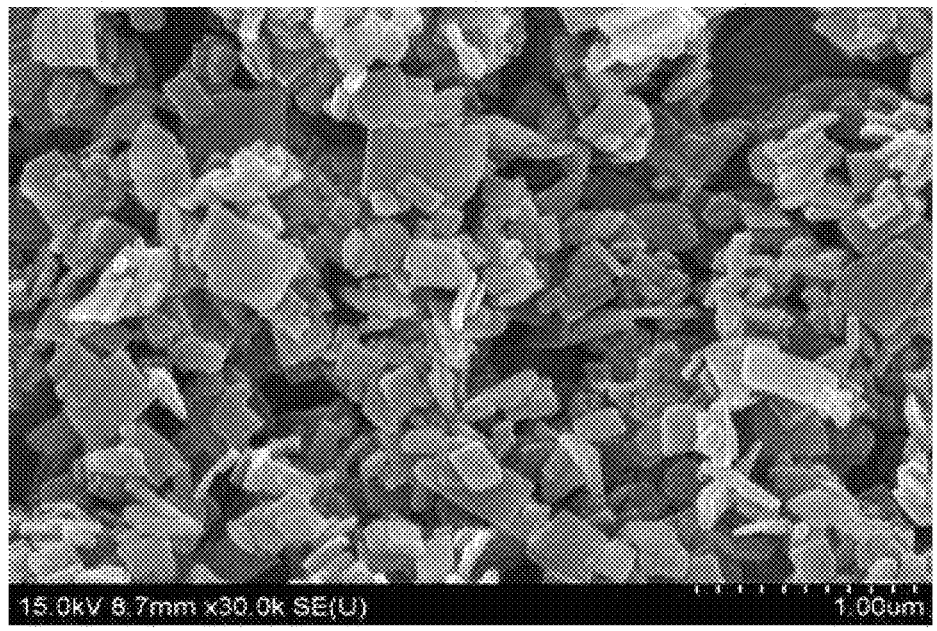
[FIG. 2]
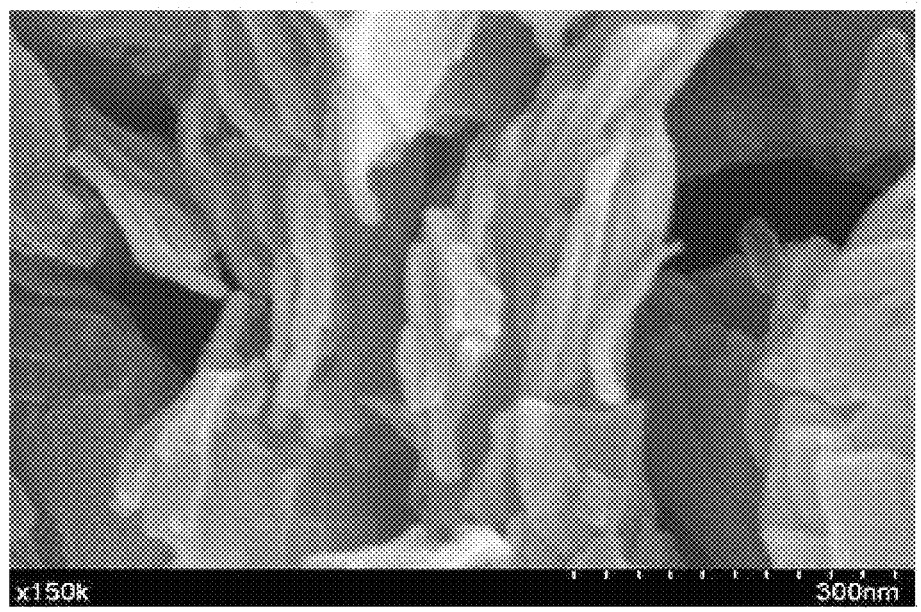

ORGANIC ZINC CATALYST AND PREPARATION METHOD THEREOF

This application is a National Stage Application of International Application No. PCT/KR2014/010304, filed on Oct. 30, 2014, which claims the benefit of Korean Patent Application No. 10-2013-0132818, filed on Nov. 4, 2013, Korean Patent Application No. 10-2014-0148608, filed on Oct. 29, 2014 and Korean Patent Application No. 10-2014-0148609, filed on Oct. 29, 2014, all of which are hereby incorporated by reference in their entirety for all purposes as if fully set forth herein.

TECHNICAL FIELD

The present disclosure relates to an organic zinc catalyst and a preparation method thereof, and to a method of preparing poly(alkylene carbonate) using the catalyst.

BACKGROUND OF ART

After the Industrial Revolution, humans established modern society while consuming huge amounts of fossil fuel which increases a carbon dioxide concentration in the air, and the increase of the carbon dioxide concentration is further promoted by environmental destruction such as deforestation or the like. Since global warming is caused by an increase in greenhouse gases such as carbon dioxide, Freon, or methane in the air, it is important to decrease the concentration of carbon dioxide that significantly contributes to the global warming, and various researches into emission regulations or stabilization of carbon dioxide have been conducted around the world.

Among them, a copolymerization reaction of carbon dioxide and epoxide found by Inoue et al. has been expected to be a reaction capable of solving the global warming problem, and research has been actively conducted in view of using carbon dioxide as a carbon source as well as in view of chemical fixation of carbon dioxide. Particularly, a poly(alkylene carbonate) resin formed by polymerization of carbon dioxide and epoxide has been recently spotlighted as a kind of biodegradable resin.

Various catalysts for preparing this poly(alkylene carbonate) resin have been studied and suggested in the past, and as a representative catalyst, a zinc dicarboxylate-based catalyst such as a zinc glutarate catalyst in which zinc and dicarboxylic acid are bonded to each other has been known.

The zinc dicarboxylate-based catalyst as described above, represented by the zinc glutarate catalyst, is formed by reacting a zinc precursor and a dicarboxylic acid such as glutaric acid with each other, and has a fine crystalline particle shape. However, it was difficult to control the zinc dicarboxylate-based catalyst having the crystalline particle shape to have a uniform and fine particle size during a preparation process. The existing zinc dicarboxylate-based catalyst has a particle size of a nanometer scale, but an aggregate having an increased particle size and a decreased surface area is formed in a medium by aggregation of catalyst particles such that at the time of preparing the poly(alkylene carbonate) resin, the activity may be deteriorated.

Meanwhile, according to the X-ray single crystal structure of ZnGA reported by Moonhor Ree et al., the center of each $Zn^{2+}$ is coordinated to oxygen atoms derived from four different carboxyl groups, and a distance between $Zn^{2+}$ ions is 4.639 Å (Moonhor Ree et al., Chem. Mater. 2004, 16, 2981).

According to the reported crystal structure of ZnGA, there is almost no void space within the crystal, considering the van der Waals radius. Therefore, a polymerization reaction using the organic zinc catalyst occurs mainly on the surface of the catalyst. For this reason, polymerization activity of the organic zinc catalyst greatly depends on the surface area of the catalyst.

In this regard, it is known that as the zinc precursor used in the preparation of the zinc dicarboxylate-based catalyst has a smaller size, the produced catalyst has higher activity. International Patent Publication No. WO2011/107577 discloses a method of synthesizing a catalyst after increasing a specific surface area of a zinc source used in the preparation of an organic zinc catalyst by surface treatment of the zinc source with organosilane. However, this method requires several steps (reaction, selection, drying, etc.) in the surface treatment of the zinc source with organosilane, and therefore there is a limitation in that this method is inefficient considering improvement degree of the catalytic activity.

For this reaction, there is often a case that the existing known zinc dicarboxylate-based catalyst has a relatively large particle size, a small surface area, and a non-uniform particle shape. Therefore, in the case of performing a polymerization process for preparing a poly(alkylene carbonate) resin using the zinc dicarboxylate-based resin, a sufficient contact area between a reactant and the catalyst is not secured, such that sufficient polymerization activity may not be exhibited. In addition, there is often a case that the activity of the existing zinc dicarboxylate-based catalyst itself is not satisfactory.

PRIOR ART DOCUMENTS

Patent Document (Patent Document 1) Korean Patent No. 10-0722380 (2007 May, 28)
(Patent Document 2) International Patent Publication No. WO/2011/107577 (2011 Sep. 9)

Non-Patent Document (Non-Patent Document 1) Moonhor Ree et al., Chem. Mater. 2004, 16, 2981

DETAILED DESCRIPTION OF THE INVENTION

Technical Problem

The present invention provides an organic zinc catalyst which has a smaller thickness and a larger surface area to exhibit more improved activity in the polymerization for the preparation of a poly(alkylene carbonate) resin.

Further, the present invention provides a method of preparing the organic zinc catalyst having the above-described characteristics.

Furthermore, the present invention provides a method of preparing a poly(alkylene carbonate) resin using the organic zinc catalyst.

Technical Solution

According to the present invention, a method of preparing an organic zinc catalyst is provided, the method including the step of reacting a zinc precursor and dicarboxylic acid having 3 to 20 carbon atoms to form zinc dicarboxylate-based particles in a liquid medium containing a polar solvent and a non-polar solvent at a volume ratio of 30:70 to 75:25.

Further, according to the present invention, an organic zinc catalyst including the dicarboxylate-based particles which are obtained by reacting a zinc precursor and dicarboxylic acid having 3 to 20 carbon atoms in a liquid medium containing a polar solvent and a non-polar solvent at a volume ratio of 30:70 to 75:25 is provided, in which the particle has an average particle thickness of 30 nm or less and an argon adsorption Brunauer-Emmett-Teller (BET) surface area of 20 $m^2/g$ or higher.

Furthermore, according to the present invention, a method of preparing a poly(alkylene carbonate) resin is provided, the method including the step of polymerizing a monomer containing epoxide and carbon dioxide in the presence of the organic zinc catalyst.

Hereinafter, an organic zinc catalyst, a preparation method thereof, and a method of preparing a poly(alkylene carbonate) resin using the organic zinc catalyst according to exemplary embodiments of the present invention will be described in detail.

Unless particularly described in the present specification, technical terms are only used to describe a specific embodiment, and are not intended to limit the present invention. In addition, singular forms used in the present specification include plural forms as long as they do not have clearly different meanings. Further, the term 'include' used in the present specification is to specify a specific property, region, integer, step, operation, factor, and/or component, but does not exclude presence or addition of another specific property, region, integer, step, operation, factor, component, and/or group.

I. Preparation of Organic Zinc Catalyst

According to an aspect of the present invention, a method of preparing an organic zinc catalyst is provided, the method including the step of reacting a zinc precursor and dicarboxylic acid having 3 to 20 carbon atoms to form zinc dicarboxylate-based particles in a liquid medium containing a polar solvent and a non-polar solvent at a volume ratio of 30:70 to 75:25.

The organic zinc catalysts, for example, zinc glutarate (ZnGA) catalysts, have a thin flat rectangular parallelepiped shape, and most of them have a surface area of less than 20 $m^2/g$. For example, from the crystal structure, when the density of the organic zinc catalyst particle is theoretically regarded as 2.1 $g/cm^3$, a particle having a size (width× length×thickness) of 1 µm×1 µm×0.1 µm may have a surface area of 11.4 $m^2/g$, and a particle having a size of 0.5 µm×0.5 µm×0.1 µm may have a surface area of 13.3 $m^2/g$.

However, if the thickness of the organic zinc catalyst particle is reduced by half to as thin as 1 µm×1 µm×0.05 µm, its surface area may be increased to 20.9 $m^2/g$. As such, the result of the present inventors suggests that when the thickness, rather than the width or length, of the organic zinc catalyst particle is reduced, the surface area of the catalyst particle is more effectively increased.

Surprisingly, continuous experimental results of the present inventors showed that when synthesis of the organic zinc catalyst using the zinc precursor and dicarboxylic acid is performed in a liquid medium containing a polar solvent and a non-polar solvent at a particular volume ratio, it is possible to prepare a catalyst of which particle thickness is smaller than those of the existing catalysts to have a larger surface area.

It is assumed that when the reaction is allowed in the liquid medium containing the polar solvent and the non-polar solvent at a particular volume ratio, the zinc precursors as an active ingredient of the catalyst are uniformly dispersed in a reaction system, and they hardly aggregate and thus all of them are reacted with dicarboxylic acid to form the catalyst.

Due to the catalyst particle having a small thickness and a large surface area, it is easier to disperse and control the catalyst particle in the reaction solution. Therefore, the organic zinc catalyst is very preferably applied to the preparation of a poly(alkylene carbonate) resin by reaction of carbon dioxide and epoxide.

The preparation method of the organic zinc catalyst according to an embodiment of the present invention includes the step of reacting the zinc precursor and dicarboxylic acid to form the zinc dicarboxylate-based particles.

In particular, according to an embodiment of the present invention, the reaction of the zinc precursor and dicarboxylic acid is performed in the liquid medium containing the polar solvent and the non-polar solvent at a volume ratio of 30:70 to 75:25.

As such, when the polar solvent and the non-polar solvent are mixed as the liquid medium for synthesis of the organic zinc catalyst, in particular, when the volume ratio of the polar solvent and the non-polar solvent in the liquid medium is adjusted to 30:70 to 75:25, it is possible to prepare an organic zinc catalyst having a small thickness of 30 nm or less and a large surface area of 30 $m^2/g$ or more.

This effect cannot be achieved when the polar solvent or the non-polar solvent is used singly as the liquid medium, or when the volume ratio of the polar solvent and the non-polar solvent does not satisfy the above range. That is, in order to prepare the organic zinc catalyst having a small thickness and a large surface area within the above range, it is preferable that 30 vol % or more of the polar solvent and 70 vol % or less of the non-polar solvent are included in the liquid medium. However, if an excessively large amount of the polar solvent or an excessively small amount of the non-polar solvent is included in the liquid medium, non-uniform reaction of the zinc precursor and dicarboxylic acid occurs, and thus it is difficult to prepare an organic zinc catalyst satisfying the above-described thickness and surface area. Therefore, 75 vol % or less of the polar solvent and 25 vol % or more of the non-polar solvent are preferably included in the liquid medium.

The polarity of solvents is divided into polar or non-polar according to dielectric constants of the solvents. Generally, a solvent having a dielectric constant of less than 15 at 25° C. or lower is considered to be a non-polar solvent. However, according to an embodiment of the present invention, it is preferable that a solvent having a dielectric constant of 20 or more at 25° C. or lower is used as a polar solvent, and a solvent having a dielectric constant of less than 15 at 25° C. or lower is preferably used as a non-polar solvent, in order to achieve a more remarkable effect than with the above-described value.

Non-limiting examples of the polar solvent may include one or more compounds selected from the group consisting of methanol, ethanol, acetic acid, acetone, N,N-dimethylformamide, N,N-dimethylacetamide, propylene carbonate, acetonitrile, dimethyl sulfoxide, and hexamethylphosphotriamide.

Non-limiting examples of the non-polar solvent may include one or more compounds selected from the group consisting of toluene, benzene, xylene, diethylether, tetrahydrofuran, 1,4-dioxane, dimethylcarbonate, and diethylcarbonate.

Meanwhile, any zinc precursor generally used in the preparation of the zinc dicarboxylate-based catalyst may be used as the zinc precursor without particular limitation, and specific examples of the zinc precursor may include zinc oxide, zinc sulfoxide ($ZnSO_4$), zinc chlorate ($Zn(ClO_3)_2$), zinc nitrate ($Zn(NO_3)_2$), zinc acetate ($Zn(OAc)_2$), zinc hydroxide, etc.

Dicarboxylic acid having 3 to 20 carbon atoms may be used as dicarboxylic acid which reacts with the zinc precursor. More specifically, the dicarboxylic acid may be an aliphatic dicarboxylic acid selected from the group consisting of malonic acid, glutaric acid, succinic acid, and adipic acid, or an aromatic dicarboxylic acid selected from the group consisting of terephthalic acid, isophthalic acid, homophthalic acid, and phenylglutaric acid. In addition, various aliphatic and aromatic dicarboxylic acids having 3 to 20 carbon atoms may be used. However, in terms of the activity of the organic zinc catalyst, glutaric acid may be appropriately used as the dicarboxylic acid, and the zinc dicarboxylate-based organic zinc catalyst is appropriately a zinc glutarate-based catalyst.

According to an embodiment of the present invention, the dicarboxylic acid may be used in an amount equivalent to or higher than the amount of the zinc precursor, and more specifically, the dicarboxylic acid may be used in an amount of about 1 to 1.5 mol, or about 1.1 to 1.3 mol, based on 1 mol of the zinc precursor. When the reaction is performed using dicarboxylic acid in an amount equivalent to or excessively higher than the amount of the zinc precursor, the reaction may occur slowly while the uniformly dispersed zinc precursors are surrounded by excessive dicarboxylic acid molecules or ions. Therefore, zinc precursors may react with dicarboxylic acids while zinc precursors hardly aggregate with each other, and therefore, an organic zinc catalyst which has a smaller thickness and a larger surface area to exhibit improved activity may be obtained.

The reaction step may be performed in the above-described liquid medium in which reactants including the zinc precursor and the dicarboxylic acid exist (for example, the reaction is performed in a state of a solution or dispersion in which the reactants are dissolved or dispersed), but the reaction may be performed while adding a solution or dispersion containing the zinc precursor in portions two times or more to a solution or dispersion containing the dicarboxylic acid.

That is, some of the solution or dispersion containing the zinc precursor is primarily injected to the solution or dispersion containing the dicarboxylic acid to perform the reaction, and then the rest of the reaction is performed while adding the rest of the solution or dispersion containing the zinc precursor in portions. Therefore, the entire reaction step may be performed while maintaining the molar ratio of the dicarboxylic acid in the reaction system, and the organic zinc catalyst in a form of the zinc dicarboxylate-based catalyst having a more uniform and fine particle size and improved activity may be obtained. Further, the entire reaction step may be performed while uniformly dripping the solution or dispersion containing the zinc precursor in a droplet form into the solution or dispersion containing the dicarboxylic acid.

Further, the reaction step of the zinc precursor and the dicarboxylic acid may be performed at about 20 to 110° C., preferably at 50 to 100° C., for about 1 to 20 h. In addition, as the zinc precursor is added in portions at the same time interval in the entire reaction time, the above molar ratio of the dicarboxylic acid in the reaction system may be maintained throughout the entire reaction step as described above. The organic zinc catalyst which has a smaller thickness and a larger surface area to exhibit improved activity may be prepared in a high yield by performing the reaction step under the reaction conditions as described above.

II. Organic Zinc Catalyst

According to another aspect of the present invention, an organic zinc catalyst including the dicarboxylate-based particles which are obtained by reacting a zinc precursor and dicarboxylic acid having 3 to 20 carbon atoms in a liquid medium containing a polar solvent and a non-polar solvent at a volume ratio of 30:70 to 75:25 is provided, in which the particles have an average particle thickness of 30 nm or less and an argon adsorption Brunauer-Emmett-Teller (BET) surface area of 20 $m^2$/g or higher.

Basically, the zinc dicarboxylate-based particle is a monoclinic particle, and is a non-porous particle having almost no void space within the crystal, considering the van der Waals radii of the elements.

In particular, the organic zinc catalyst is obtained by reacting the zinc precursor and dicarboxylic acid in the liquid medium, and preferably prepared by the above-described method. That is, the organic zinc catalyst may be prepared in a liquid medium containing the polar solvent and non-polar solvent at a volume ratio of 30:70 to 75:25, as described above.

Therefore, the organic zinc catalyst may have a smaller thickness and a larger surface area than organic zinc catalysts prepared by the known methods (e.g., the polar solvent or the non-polar solvent is used singly, or the volume ratio of the polar solvent and the non-polar solvent does not satisfy the above range).

Specifically, the zinc dicarboxylate-based particle according to an embodiment of the present invention has a thin flat rectangular parallelepiped shape, and it may have an average particle thickness of 30 nm or less, preferably 25 nm or less (e.g., 15 to 25 nm). In this regard, the particle thickness refers to a width between a face and a face parallel thereto in a rectangular parallelepiped particle. The average particle thickness may be measured by SEM, or calculated from the BET surface area value of the particle.

The zinc dicarboxylate-based particle according to the present invention may have a thickness as thin as half of the thickness of the existing organic zinc catalyst to have a remarkably large surface area. For example, the zinc dicarboxylate-based particle according to an embodiment of the present invention may have an argon adsorption Brunauer-Emmett-Teller (BET) surface area of 20 $m^2$/g or more, preferably 30 $m^2$/g or more, and more preferably 35 $m^2$/g or more (e.g., 35 to 45 $m^2$/g).

As such, the zinc dicarboxylate-based particle has a small thickness and a large surface area without pores in the interior, and therefore it may be very preferably applied to the preparation of a poly(alkylene carbonate) resin by reaction of carbon dioxide and epoxide.

III. Preparation Method of Poly(Alkylene Carbonate) Resin Using the Catalyst

According to still another aspect, a method of preparing a poly(alkylene carbonate) resin is provided, the method including the step of polymerizing a monomer containing epoxide and carbon dioxide in the presence of the above-described organic zinc catalyst.

In the preparation method of a resin as described above, the organic zinc catalyst may be used in a form of a non-uniform catalyst, and the polymerizing may be performed by solution polymerization in an organic solvent. Therefore, reaction heat may be suitably controlled, and it may be easy to control a molecular weight or viscosity of a desired poly(alkylene carbonate) resin.

In this solution polymerization, as the solvent, one or more selected from the group consisting of methylene chloride, ethylene dichloride, trichloroethane, tetrachloroethane, chloroform, acetonitrile, propionitrile, dimethylformamide, N-methyl-2-pyrrolidone, dimethyl sulfoxide, nitromethane, 1,4-dioxane, hexane, toluene, tetrahydrofuran, methylethylketone, methylamineketone, methyl isobutyl ketone, acetone, cyclohexanone, trichloroethylene, methyl acetate, vinyl acetate, ethyl acetate, propyl acetate, butyrolactone, caprolactone, nitropropane, benzene, styrene, xylene, and methyl propasol may be used. Among them, when methylene chloride or ethylene dichloride is used as the solvent, a polymerization reaction may be more effectively performed.

The solvent may be used in a weight ratio of about 1:0.5 to 1:100, preferably about 1:1 to 1:10, based on the epoxide. In this regard, if the ratio is excessively low (less than about 1:0.5), the solvent does not suitably serve as a reaction medium, such that it may be difficult to implement advantages of the solution polymerization as described above. Further, if the ratio is more than about 1:100, a concentration of the epoxide or the like is relatively decreased, such that productivity may be deteriorated, a molecular weight of a finally formed resin may be decreased, or side reactions may be increased.

In addition, the organic zinc catalyst may be injected in a molar ratio of about 1:50 to 1:1000, based on the epoxide. More preferably, the organic zinc catalyst may be injected in a molar ratio of about 1:70 to 1:600, or 1:80 to 1:300, based on the epoxide. If the ratio is excessively small, it is difficult to obtain sufficient catalytic activity at the time of solution polymerization. On the contrary, if the ratio is excessively large, an excessive amount of catalyst is used, which is not efficient, and by-products may be formed, or back-biting of the resin may occur due to heating in the presence of the catalyst.

Meanwhile, the pressure of carbon dioxide is not particularly limited, but it may be preferably controlled to 0.1 to 20 MPa or 0.1 to 10 MPa, or 0.1 to 5 MPa, considering the reaction efficiency.

As the epoxide, one or more selected from the group consisting of alkylene oxides having 2 to 20 carbon atoms, which are substituted or unsubstituted with a halogen or an alkyl group having 1 to 5 carbon atoms; cyclo alkylene oxides having 4 to 20 carbon atoms, which are substituted or unsubstituted with a halogen or an alkyl group having 1 to 5 carbon atoms; and styrene oxides having 8 to 20 carbon atoms, which are substituted or unsubstituted with a halogen or an alkyl group having 1 to 5 carbon atoms, may be used. As a representative epoxide, alkylene oxide having 2 to 20 carbon atoms, which is substituted or unsubstituted with a halogen or an alkyl group having 1 to 5 carbon atoms, may be used.

Specific examples of the epoxide may include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, and the like. As the most representative epoxide, ethylene oxide is used.

In addition, the above-mentioned solution polymerization may be performed at about 50 to 100° C. and at about 15 to 50 bar for about 1 to 60 h. Further, the above-mentioned solution polymerization may be more preferably performed at about 70 to 90° C. and at about 20 to 40 bar for about 3 to 40 h.

Meanwhile, since other polymerization processes and conditions except for the above-mentioned contents may depend on general polymerization conditions for preparing a poly(alkylene carbonate) resin, a detailed description thereof will be omitted.

Advantageous Effects

According to the present invention, an organic zinc catalyst which has a smaller thickness and a larger surface area to exhibit more improved activity in the polymerization for the preparation of a poly(alkylene carbonate) resin is provided.

BRIEF DESCRIPTION OF THE DRAWINGS

FIG. 1 is a scanning electron microscopic image of an organic zinc catalyst according to a comparative example of the present invention; and FIG. 2 is a scanning electron microscopic image of an organic zinc catalyst according to an example of the present invention.

DETAILED DESCRIPTION OF THE EMBODIMENTS

Hereinafter, the preferred examples are provided for better understanding. However, these examples are for illustrative purposes only, and the invention is not intended to be limited by these examples.

Example 1

75 ml of a solvent containing ethanol and toluene at a volume ratio of 50:50, 50 mmol of ZnO, and 50 mmol of glutaric acid were added to a 250 mL-round bottom flask at room temperature, the temperature thereof was raised to 60° C., and they were allowed to react under vigorous agitation for 10 h. Thereafter, the reaction vessel was cooled to room temperature, and precipitates were separated by filtration. The precipitates thus separated were washed with acetone three times or more. The precipitates thus washed were dried in a vacuum oven at 85° C. for 12 h, and finally, 9.5 g of zinc glutarate particles was obtained in a yield of about 97%.

Example 2

9.3 g of zinc glutarate particles was prepared in a yield of about 95% in the same manner as in Example 1, except that 75 ml of a solvent containing ethanol and toluene at a volume ratio of 75:25 was used.

Example 3

9.3 g of zinc glutarate particles was prepared in a yield of about 95% in the same manner as in Example 1, except that 75 ml of a solvent containing ethanol and toluene at a volume ratio of 30:70 was used.

Comparative Example 1

9.5 g of zinc glutarate particles was prepared in a yield of about 97% in the same manner as in Example 1, except that 75 ml of toluene was used as a solvent.

Comparative Example 2

9.3 g of zinc glutarate particles was prepared in a yield of about 95% in the same manner as in Example 1, except that 75 ml of a solvent containing ethanol and toluene at a volume ratio of 25:75 was used.

Comparative Example 3

9.3 g of zinc glutarate particles was prepared in a yield of about 95% in the same manner as in Example 1, except that 75 ml of a solvent containing ethanol and toluene at a volume ratio of 80:20 was used.

Experimental Example 1

Zinc glutarate particles were dried under vacuum at 200° C. for 3 h, argon adsorption Brunauer-Emmett-Teller (BET) surface area was measured using an instrument for measuring a particle surface area, and the results are given in the following Table 1.

Experimental Example 2

An average particle size (D50) of the zinc glutarate particle and average thickness of the side of the particles were measured and the results are given in the following Table 1.

In this regard, the average particle size was measured by PSA (particle size analysis) using MASTERSIZER 3000 manufactured by Malvern.

The average particle thickness was measured by SEM image analysis of particles having a length and width in the range of about 100 to 500 nm for convenience of the thickness measurement. An SEM image of Comparative Example 1 is shown in FIG. 1, and an SEM image of Example 1 is shown in FIG. 2.

Experimental Example 3

Zinc glutarate obtained in the example or comparative example was used as a catalyst to polymerize and prepare a polyethylene carbonate by the following method. First, in a glove box, 0.2 g of the catalyst and 8.52 g of dichloromethane (methylene chloride) were added to a high-pressure reactor, and 8.9 g of ethylene oxide was added thereto. Thereafter, the reactor was pressurized to 30 bar using carbon dioxide. Polymerization was performed at 70° C. for 3 h. After completing the polymerization, unreacted carbon dioxide and ethylene oxide were removed, together with the solvent, dichloromethane. In order to quantify polyethylene carbonate thus prepared, the remaining solids were completely dried and quantified. The catalytic activities according to the polymerization results are given in the following Table 1.

TABLE 1

| | BET surface area ($m^2/g$) | Average particle size (nm) | Average particle thickness (nm) | Catalytic activity (g-polymer/g-catalyst) |
|---|---|---|---|---|
| Example 1 | 41.2 | 660 | 20 | 42 |
| Example 2 | 38.2 | 800 | 21 | 36 |
| Example 3 | 22.5 | 670 | 29 | 35 |
| Comparative Example 1 | 11.9 | 530 | 62 | 23 |
| Comparative Example 2 | 15.1 | 700 | 50 | 30 |
| Comparative Example 3 | 17.2 | 740 | 45 | 26 |

Referring to Table 1, zinc glutarates according to the comparative examples were found to have a BET surface area of less than 20 $m^2/g$ and an average particle thickness of more than 40 nm. In contrast, zinc glutarates according to the examples were found to have a large BET surface area of 20 $m^2/g$ or more and a low average particle thickness of 30 nm or less, and to have higher catalytic activity.

The invention claimed is:

1. A method of preparing an organic zinc catalyst, the method comprising:
   reacting a zinc precursor and dicarboxylic acid having 3 to 20 carbon atoms to form zinc dicarboxylate-based particles in a liquid medium containing a polar solvent and a non-polar solvent at a volume ratio of 30:70 to 75:25,
   wherein the zinc dicarboxylate-based particles formed by the reaction have an average particle thickness of 30 nm or less and an argon adsorption Brunauer-Emmett-Teller (BET) surface area of 20 $m^2/g$ or more.

2. The method of claim 1, wherein the polar solvent is a solvent having a dielectric constant of 20 or more at 25° C. or lower, and the non-polar solvent is a solvent having a dielectric constant of less than 15 at 25° C. or lower.

3. The method of claim 1, wherein the polar solvent is one or more compounds selected from the group consisting of methanol, ethanol, acetic acid, acetone, N,N-dimethylformamide, N,N-dimethylacetamide, propylene carbonate, acetonitrile, dimethyl sulfoxide, and hexamethylphosphotriamide.

4. The method of claim 1, wherein the non-polar solvent is one or more compounds selected from the group consisting of toluene, benzene, xylene, diethylether, tetrahydrofuran, 1,4-dioxane, dimethylcarbonate, and diethylcarbonate.

5. The method of claim 1, wherein the zinc precursor is one or more compounds selected from the group consisting of zinc oxide, zinc sulfoxide ($ZnSO_4$), zinc chlorate ($Zn(ClO_3)_2$), zinc nitrate ($Zn(NO_3)_2$), zinc acetate ($Zn(OAc)_2$), and zinc hydroxide.

6. The method of claim 1, wherein the dicarboxylic acid having 3 to 20 carbon atoms is one or more compounds selected from the group consisting of malonic acid, glutaric acid, succinic acid, adipic acid, terephthalic acid, isophthalic acid, homophthalic acid, and phenylglutaric acid.

7. The method of claim 1, wherein the dicarboxylic acid is used in an amount of about 1 to 1.5 mol, based on 1 mol of the zinc precursor.

8. The method of claim 1, wherein the reaction is performed at a temperature of about 20 to 110° C. for 1 to 20 h.

* * * * *